United States Patent
Ushiyama

(10) Patent No.: US 10,686,286 B2
(45) Date of Patent: Jun. 16, 2020

(54) ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun, Shiga (JP)

(72) Inventor: Masatoshi Ushiyama, Inukami-gun (JP)

(73) Assignees: FURUKAWA ELECTRIC CO., LTD., Tokyo (JP); FURUKAWA AUTOMOTIVE SYSTEMS INC., Shiga (JP)

(*) Notice: Subject to any disclaimer, the term of this patent is extended or adjusted under 35 U.S.C. 154(b) by 0 days.

(21) Appl. No.: 16/298,450

(22) Filed: Mar. 11, 2019

(65) Prior Publication Data
US 2019/0207352 A1 Jul. 4, 2019

Related U.S. Application Data

(63) Continuation of application No. PCT/JP2017/029257, filed on Aug. 14, 2017.

(30) Foreign Application Priority Data

Sep. 12, 2016 (JP) .................... 2016-177620

(51) Int. Cl.
H01R 35/02 (2006.01)
H01R 35/04 (2006.01)

(52) U.S. Cl.
CPC .......... H01R 35/025 (2013.01); H01R 35/04 (2013.01); *H01R 2201/26* (2013.01)

(58) Field of Classification Search
CPC ...... B62D 1/16; B62D 15/022; B60R 16/027; H01R 35/025

(Continued)

(56) References Cited

U.S. PATENT DOCUMENTS 5,151,042 A * 9/1992 Okada .................... H02G 11/00
439/15
5,229,544 A * 7/1993 Horiuchi .............. H01R 35/025
174/562

(Continued)

FOREIGN PATENT DOCUMENTS

JP 05-32222 A 2/1993
JP 09-204972 A 8/1997

(Continued)

OTHER PUBLICATIONS

International Search Report (PCT/ISA/210) issued in PCT/JP2017/029257, dated Oct. 31, 2017.

(Continued)

*Primary Examiner* — Tulsidas C Patel
*Assistant Examiner* — Marcus E Harcum
(74) *Attorney, Agent, or Firm* — Birch, Stewart, Kolasch & Birch, LLP

(57) ABSTRACT

Provided is a rotary connector device comprising a rotator, a stator that is a member configured to hold the rotator rotatably around an axis line and form an annular space around the axis line between the rotator and the stator, a rotator side connector held by the rotator and configured to enable an external electrical connection, a stator side connector held by the stator and configured to enable an external electrical connection, and a flat cable that is flexible, housed in the annular space, and configured to electrically connect the rotator side connector and the stator side connector, wherein the rotator includes a rotator main body that is an annular member disposed around the axis line, and a connector housing section having a connector housing space that is a space passing through between the annular space and outside of the annular space.

4 Claims, 9 Drawing Sheets

(58) Field of Classification Search
USPC .................................................. 439/15, 164
See application file for complete search history.

(56) References Cited

U.S. PATENT DOCUMENTS

| | | | | |
|---|---|---|---|---|
| 5,728,975 A * | 3/1998 | Tanaka | ................... | H01R 12/62 174/88 B |
| 5,741,145 A * | 4/1998 | Kikkawa | ............... | B60R 16/027 439/15 |
| 5,904,585 A | 5/1999 | Nishikigi et al. | | |
| 5,915,983 A * | 6/1999 | Ishikawa | .............. | H01R 13/506 439/15 |
| 6,272,912 B1 * | 8/2001 | Sano | ....................... | B62D 15/02 33/1 N |
| 6,471,529 B2 * | 10/2002 | Oishi | .................... | B60R 16/027 439/164 |
| 7,798,816 B2 * | 9/2010 | Oishi | ...................... | B62D 1/16 439/15 |
| 8,678,835 B2 * | 3/2014 | Takahashi | ............ | H01R 12/592 439/13 |
| 8,834,179 B2 * | 9/2014 | Park | ..................... | B60R 16/027 439/146 |
| 2002/0168885 A1 * | 11/2002 | Araki | ................... | H01R 35/025 439/164 |
| 2005/0124177 A1 * | 6/2005 | Umemura | .......... | H01R 13/6272 439/15 |
| 2009/0007399 A1 * | 1/2009 | Sato | ........................ | H01R 9/16 24/458 |
| 2009/0317994 A1 | 12/2009 | Oishi | | |
| 2013/0094172 A1 * | 4/2013 | Hiroki | .................. | B60R 16/027 361/827 |
| 2013/0252441 A1 * | 9/2013 | Yamaguchi | ........... | B60R 16/027 439/15 |
| 2014/0051267 A1 * | 2/2014 | Asakura | ................ | B60R 16/027 439/15 |
| 2016/0006203 A1 | 1/2016 | Takahashi et al. | | |
| 2016/0336704 A1 * | 11/2016 | Tsushima | .............. | B60R 16/027 |

FOREIGN PATENT DOCUMENTS

| JP | 2005-174635 A | 6/2005 |
|---|---|---|
| JP | 2016-18591 A | 2/2016 |

OTHER PUBLICATIONS

Written Opinion of the International Searching Authority (PCT/ISA/237) issued in PCT/JP2017/029257, dated Oct. 31, 2017.
International Preliminary Report on Patentability and English Translation of Written Opinion of the International Searching Authority, dated Mar. 12, 2019 (Forms PCT/IB/373 and PCT/ISA/237).
Chinese Office Action dated Mar. 19, 2020, for corresponding Chinese Patent Application No. 201780055852.2, with Machine Translation.

* cited by examiner

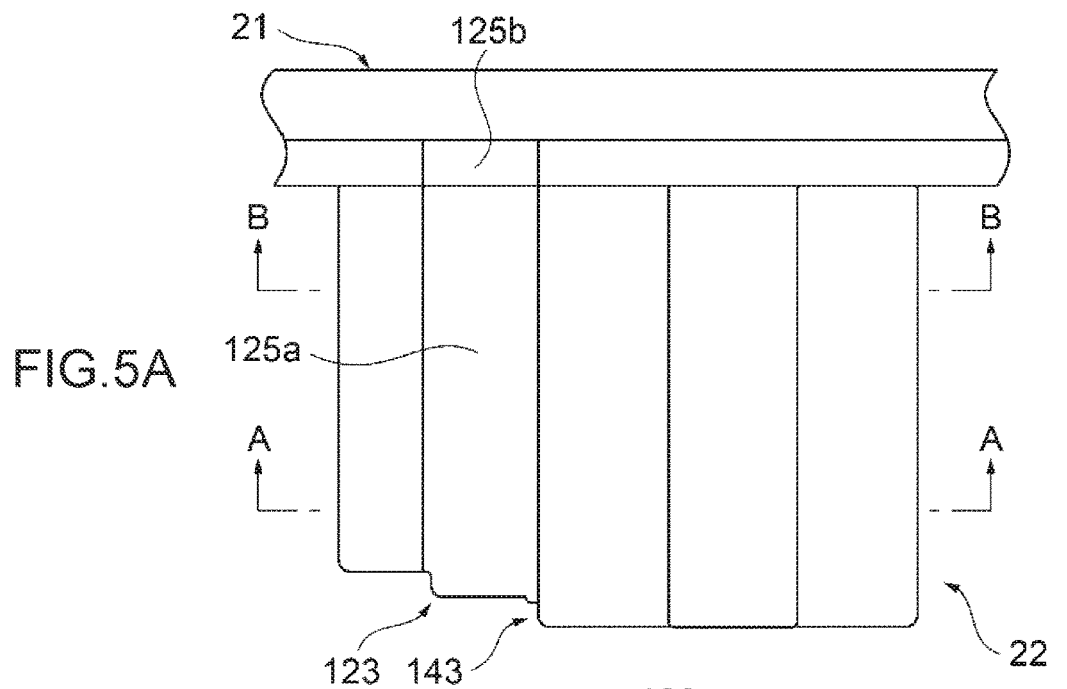
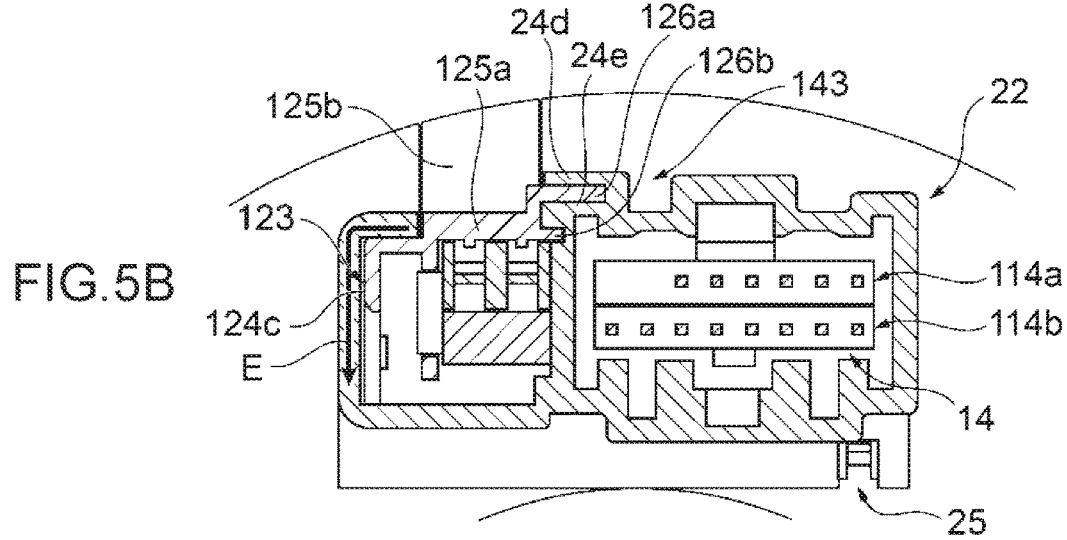
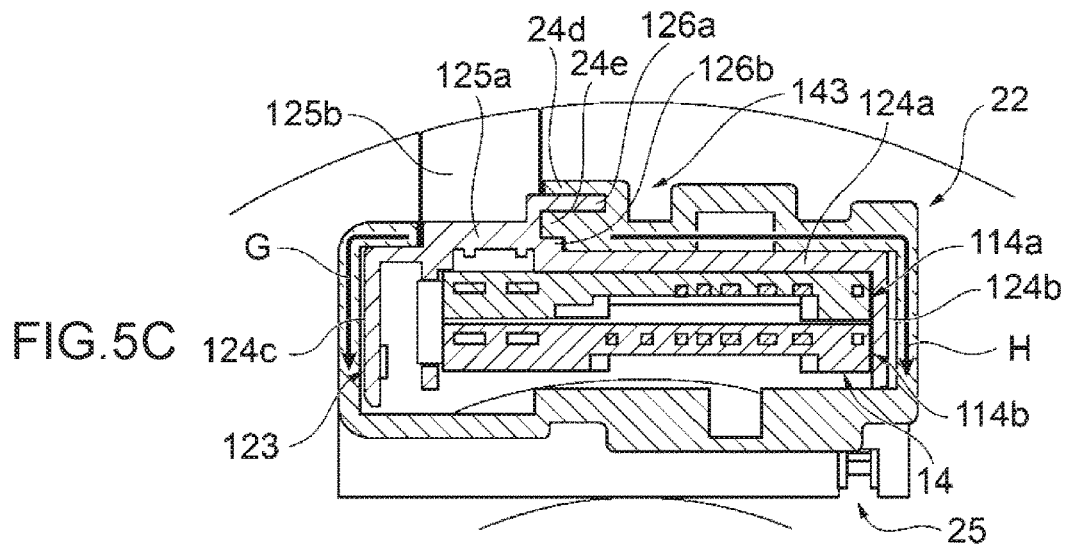

ROTARY CONNECTOR DEVICE

CROSS REFERENCE TO RELATED APPLICATIONS

This is a continuation application of International Patent Application No. PCT/JP2017/029257 filed Aug. 14, 2017, which claims the benefit of Japanese Patent Application No. 2016-177620, filed Sep. 12, 2016, the full contents of all of which are hereby incorporated by reference in their entirety.

TECHNICAL FIELD

The disclosure relates to a rotary connector device, and more particularly relates to a rotary connector device used for electrically connecting a steering wheel and a vehicle body with a flat cable.

BACKGROUND ART

In a vehicle such as a four-wheeled automobile, a rotary connector device for supplying electric power to airbag devices or the like is attached to a connecting portion between a steering wheel for steering and a steering shaft. The rotary connector device is attached to surround the steering shaft, and a steering column cover is attached so as to enclose the rotary connector device and the end portion of the steering shaft. In addition, in the steering wheel, a steering lower cover is attached so as to enclose the boss portion of the steering wheel.

In the above steering cover structure, the steering column cover does not rotate with the steering of the steering wheel, whereas the steering lower cover is integrally fixed with the steering wheel, and rotates in accordance with the steering of the steering wheel. The steering column cover and the steering lower cover are disposed at predetermined intervals in the axial direction of the steering shaft such that these covers do not interfere with each other when the steering wheel is steered.

In the above configuration, in the case that a driver accidentally spills a liquid such as a beverage on the steering lower cover, or in the case that dew condensation occurs on the upper wall portion of the steering lower cover, for example, the liquid may flow into the space (interval portion) between the steering column cover and the steering lower cover and reach the rotary connector. As a result, the liquid enters the inside of the rotary connector device, adheres to the inner wall of the rotary connector and the flat cable disposed inside the rotary connector device, and the operation of the steering wheel may become heavy.

Accordingly, in the related art, to prevent drinking water or the like from entering the inside of the rotary connector device, a structure has been proposed in which a gap formed between the rotator and the stator is opened toward the vertical downward direction in the rotary connector device (see Japanese Unexamined Utility Model (Registration) Application Publication No. 1993-32222).

SUMMARY

However, in the known rotary connector devices described above, although the rotary connector devices have a structure in which liquid is less likely to enter the inside of the rotary connector device, liquid may enter a connection portion between the flat cable and the connector that enables electrical connection between the flat cable and the outside, and green rust may form. As the connector housing section in which the connector of the rotator is housed is provided with a hole for holding the connector and the cable, as well as a groove formed for folding the airbag connection lead cable that extends inward from the connector back to the outside, the liquid that reaches the rotary connector device may enter inside the connector housing section from the hole or the groove and reach the connecting portion between the flat cable and the connector, and green rust may form on the connection portion.

In addition, green rust may form on the connection portion due to the moisture, salt content, and the like contained in the liquid that reaching the rotary connector device, the electric resistance value at the time of electrification of the rotary connector device may increase and become greater than the desired electric resistance value, and an external device such as an airbag may not operate, or may malfunction. As described above, in known rotary connectors, a structure with which liquid will be less likely to enter inside the connector housing section is required.

The disclosure has been made in view of the above-described problems, and has an object of providing a rotary connector device capable of suppressing liquid from entering a connector housing section and preventing green rust from forming.

To achieve the above objective, a rotary connector device according to the disclosure includes a rotator, a stator that is a member configured to hold the rotator rotatably around an axis line and form an annular space around the axis line between the rotator and the stator, a rotator side connector held by the rotator and configured to enable an external electrical connection, a stator side connector held by the stator and configured to enable an external electrical connection, and a flat cable that is flexible, housed in the annular space, and configured to electrically connect the rotator side connector and the stator side connector. The rotator includes a rotator main body that is an annular member disposed around the axis line, and a connector housing section having a connector housing space that is a space passing through between the annular space and outside of the annular space, protruding from the rotator main body to outside of the annular space, and capable of internally housing the rotator side connector. The connector housing section includes a connector holding section capable of housing, when the rotator side connector is held and inserted in a direction of protrusion from the rotator main body, the rotator side connector in the connector housing space, and a locking portion configured to lock the connector holding section in the connector housing space on a peripheral surface on an outer peripheral side among peripheral surfaces along the direction of protrusion from the rotator main body. The locking portion has a labyrinth structure in a direction, when the connector holding section is locked, from outside to inside of the connector housing space on a side housed with a connecting portion connected with the flat cable in the rotator side connector.

In a rotary connector device according to an aspect of the disclosure, the labyrinth structure is formed from an upper end in a direction of protrusion of the connector housing section to a lower end adjacent to the rotator main body.

In a rotary connector device according to an aspect of the disclosure, the locking portion includes a groove portion formed along the peripheral surface on the outer peripheral side of the connector housing section, and a protruded wall portion protruded from the peripheral surface on the outer peripheral side of the connector holding section and inserted into the groove portion.

In a rotary connector device according to an aspect of the disclosure, the connector holding section includes an outer peripheral wall portion defining the peripheral surface on the outer peripheral side, and side peripheral wall portions defining peripheral surfaces substantially vertical to the outer peripheral wall portion from an end portion in a circumferential direction of the outer peripheral wall portion toward an inner peripheral side, and the outer peripheral wall portion and the side peripheral wall portions hold the rotator side connector.

In a rotary connector device according to an aspect of the disclosure, the rotator further includes a lock portion configured to support, on the inner peripheral side, the connector holding section locked inside of the connector housing space by the locking portion, the lock portion supports the connector holding section locked in the connector housing space when a lock claw formed on the connector holding section and protruded from a peripheral surface on the inner peripheral side is locked to a lock hole formed on the connector housing section, and the connector holding section includes a contact wall portion configured to at least partially come into contact with the connector housing section between the lock claw and the connecting portion.

In a rotary connector device according to an aspect of the disclosure, in the rotator side connector, a connection conductor at least exposed toward the inner peripheral side on the connecting portion connected with the flat cable is coated with a resin material.

According to the rotary connector device of the disclosure, it is possible to suppress liquid from entering the connector housing section and to prevent green rust from forming.

BRIEF DESCRIPTION OF DRAWINGS

FIG. 3 is a perspective view of the connector holding section in the rotary connector device illustrated in FIG. 1, where

FIG. 5 is a view of a locking portion in the rotary connector device illustrated in FIG. 1, where FIG. 5A is a plan view illustrating a state of the rotator side connector housing section in the rotary connector device illustrated in FIG. 1 when viewed from an outer peripheral side, FIG. 5B is a cross-sectional view taken along line A-A illustrated in FIG. 5A, and FIG. 5C is a cross-sectional view taken along line B-B illustrated in FIG. 5A.

FIG. 8 is a perspective view of a connector holding section in the rotary connector device illustrated in FIG. 6, where

FIG. 9 is a perspective view illustrating a rotator side connector in the rotary connector device according to the embodiment of the disclosure, where

DETAILED DESCRIPTION

Hereinafter, a rotary connector device according to embodiments of the disclosure will be described with reference to the drawings. Note that the rotary connector device according to the present embodiment electrically connects a steering wheel and a steering shaft, which are steering devices in vehicles such as four-wheeled automobiles.

Figure 1:
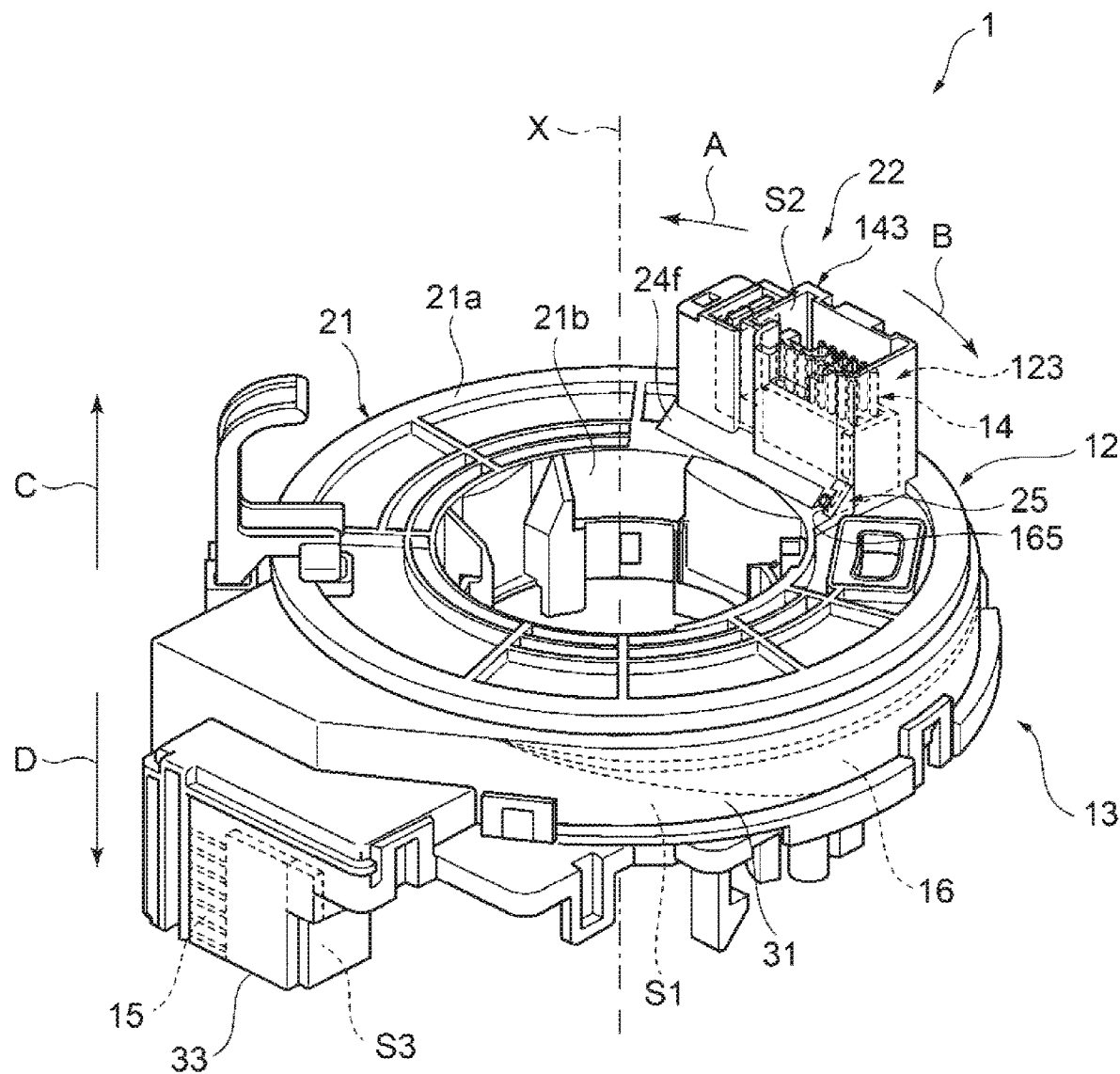
FIG. 1 is a perspective view illustrating a schematic configuration of a rotary connector device according to a first embodiment of the disclosure.

First, with reference to FIG. 1, a configuration of a rotary connector device 1 according to a first embodiment of the disclosure will be described. FIG. 1 is a perspective view illustrating a schematic configuration of the rotary connector device 1 according to a first embodiment of the disclosure.

As illustrated in FIG. 1, the rotary connector device 1 according to the first embodiment of the disclosure includes a rotator 12 and a stator 13 that is a member configured to hold the rotator 12 rotatably around an axis line X and forms an annular space (annular space S1) around the axis line X between the rotator 12 and the stator 13. In addition, the rotary connector device 1 includes a rotator side connector 14 held by the rotator 12 and configured to enable an external electrical connection, a stator side connector 15 held by the stator 13 and configured to enable an external electrical connection, and a flexible cable 16 that is a flexible flat cable configured to be housed within the annular space S1 and electrically connect the rotator side connector 14 and the stator side connector 15. In the vehicle, the stator 13 is fixed to the steering shaft, and the rotator 12 is attached to the steering wheel.

The rotator 12 includes a rotator main body 21 that is an annular member and disposed around the axis line X (a direction of an arrow A and a direction of an arrow B in FIG. 1), and a rotator side connector housing section 22 forming a rotator side connector housing space S2 that is a space passing through between the annular space S1 and outside of the annular space S1, protrudes from the rotator main body 21 to outside of the annular space S1, and capable of internally housing the rotator side connector 14. Specifically, as illustrated in FIG. 1, the rotator main body 21 includes a top plate 21a that is a hollow disc-shaped portion or a substantially hollow disc-shaped portion centered on the axis line X, and a cylindrically shaped cylindrical portion 21b that extends from an end portion on an inner circumferential side of the top plate 21a toward the annular space S1 along the axis line X. The top plate 21a defines a portion facing upward (a direction of an arrow C in FIG. 1) in the rotary connector device 1. The cylindrical portion 21b is formed so as to be rotatably engaged with a corresponding portion of the stator 13 with respect to the axis line X.

The rotator side connector housing section 22 includes a connector holding section 123 configured to house, when the rotator side connector 14 is held and inserted in a direction of protrusion from the rotator main body 21 (a direction of the axis line X), the rotator side connector 14 in the rotator side connector housing space S2, and a locking portion 143 configured to lock the connector holding section 123 in the rotator side connector housing space S2 on a peripheral surface on an outer peripheral side among peripheral surfaces in the direction of protrusion from the rotator main body 21 (the direction of the axis line X). The locking portion 143 has a labyrinth structure (mazy shape) in a direction, when the connector holding section 123 is locked, from outside to inside of the rotator side connector housing space S2 (described later, see FIG. 5). The rotator side connector housing section 22 will be described later in detail.

The rotator side connector housing space S2 provided in the rotator side connector housing section 22 is provided with, on the inner peripheral side, a lock portion 25 configured to support the connector holding section 123 locked in the rotator side connector housing space S2 by the locking portion 143. The lock portion 25 will be described later in detail.

The stator 13 includes a stator main body 31 including an engagement hole (not illustrated) that is a circular hole centered on the axis line X, and having an annular shape or a substantially annular shape centered on the axis line X, and a stator side connector housing section 33 forming a stator side connector housing space S3 for housing the stator side connector 15. The engagement hole formed in the stator main body 31 is formed so as to be able to house an end portion on a lower side (a direction of an arrow D in FIG. 1) of the cylindrical portion 21b of the rotator 12 and engage with this end portion. The rotator 12 is rotatably engaged with the engagement hole of the stator main body 31 of the stator 13 at the end portion on the lower side of the cylindrical portion 21b, and in this way the rotator 12 is rotatably held by the stator 13.

As described above, since the rotator 12 is attached to the stator 13 in the engagement hole, the annular space S1 is defined by the top plate 21a, the cylindrical portion 21b of the rotator 12, and the stator main body 31 of the stator 13.

Figure 2:
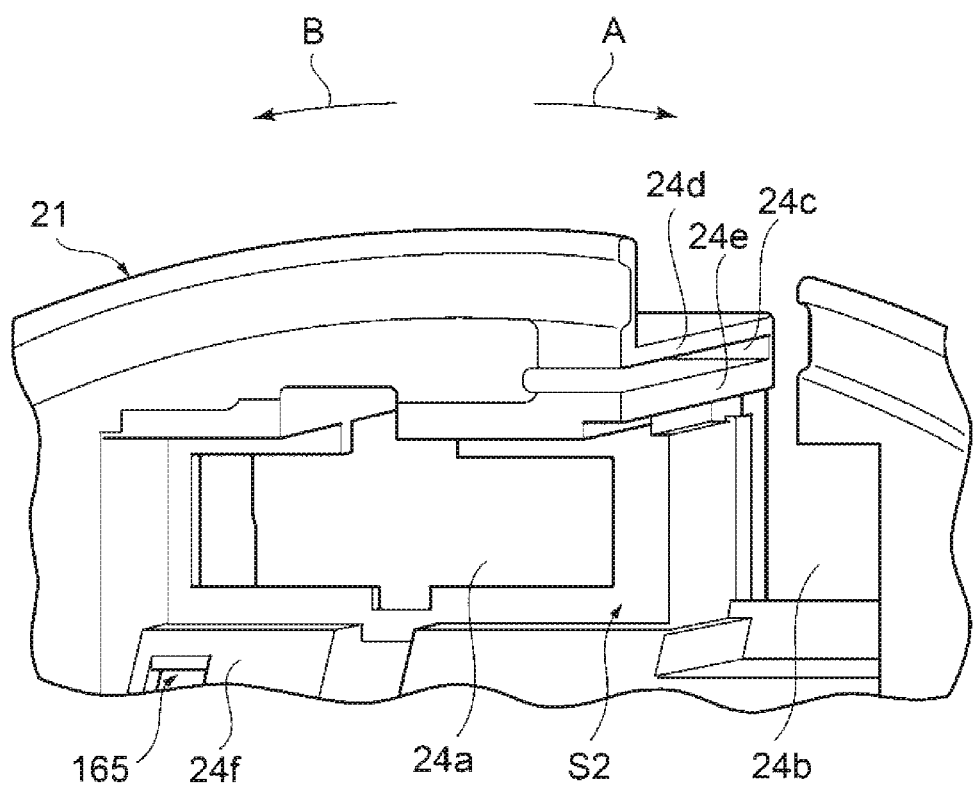
FIG. 2 is a perspective view of a rotator side connector housing section in the rotary connector device illustrated in FIG. 1.

Next, a configuration of the rotator side connector housing section 22 in the rotary connector device 1 will be described in detail with reference to FIGS. 1 and 2. FIG. 2 is a perspective view illustrating a state of the rotator side connector housing section 22 in the rotary connector device 1 illustrated in FIG. 1 when viewed from below (from the rotator main body 21 in FIG. 1).

As illustrated in FIGS. 1 and 2, the rotator side connector housing section 22 includes a cylindrical portion 24a (FIG. 2) defining a part of the rotator side connector housing space S2 extending in the direction of protrusion from the rotator main body 21 (the direction of the axis line X) and formed into a substantially cylindrical shape, and a recessed portion 24b (FIG. 2) defining a part of the rotator side connector housing space S2 formed along the peripheral surface on the outer peripheral side among the peripheral surfaces in the direction of protrusion from the rotator main body 21 (the direction of the axis line X). The cylindrical portion 24a is used to house connecting portions 116a (described later, see FIG. 4) that are portions connected with the flexible cable 16, as will be described later, and is formed to be capable of housing the connecting portions 116a. The recessed portion 24b allows lead cables with connectors for air bag connection (not illustrated), as will be described later, to pass through, and thus is formed to allow the lead cables to pass through. Specifically, the recessed portion 24b has a recessed shape that opens toward the outer peripheral side, and recesses toward the inner peripheral side from an end portion on the outer peripheral side.

The rotator side connector housing section 22 includes a groove portion 24c (FIG. 2) formed along the peripheral surface on the outer peripheral side. Specifically, the groove portion 24c has a groove shape that does not open toward the outer peripheral side but opens in a direction along the peripheral surface (the direction of the arrow A in FIG. 2), and coupled with upper end portions of groove wall portions 24d and 24e (end portions in the direction of the arrow C in FIG. 1). As will be described later, since, when the connector holding section 123 is inserted into and locked inside of the rotator side connector housing space S2, the groove portion 24c is inserted with a protruded wall portion 126a (see FIG. 3), a groove shape is formed from an upper end portion (an end portion in the direction of the arrow C in FIG. 1) to a lower end portion (adjacent to the top plate 21a of the rotator main body 21) of the rotator side connector housing section 22 to allow the protruded wall portion 126a to be inserted.

As illustrated in FIGS. 1 and 2, a lower end portion of a peripheral surface on the inner peripheral side of the rotator side connector housing section 22 is formed with an inclined portion 24f inclining from the top plate 21a of the rotator main body 21. The inclined portion 24f is formed with a lock hole 165 constituting the lock portion 25. The lock hole 165 is formed on the inner peripheral side, and passes through between inside and outside of the rotator side connector housing space S2. As will be described later, when the connector holding section 123 is locked in the rotator side connector housing space S2, a lock claw 166 (see FIG. 3) is locked to the lock hole 165, and the connector holding section 123 locked inside of the connector housing space S2 is supported. The rotator side connector housing section 22 and the rotator main body 21 are both made of insulating resin such as fluororesin, and are integrally formed.

Next, a configuration of the connector holding section 123 in the rotary connector device 1 will be described in detail with reference to FIG. 3. FIG. 3 is a view of the connector holding section 123 in the rotary connector device 1 illustrated in FIG. 1, where FIG. 3A is a perspective view of the connector holding section 123 when viewed from top (an upper end side of the rotator side connector housing section 22), and FIG. 3B is a perspective view of the connector holding section 123 when viewed from the inner peripheral side.

Figure 3A:
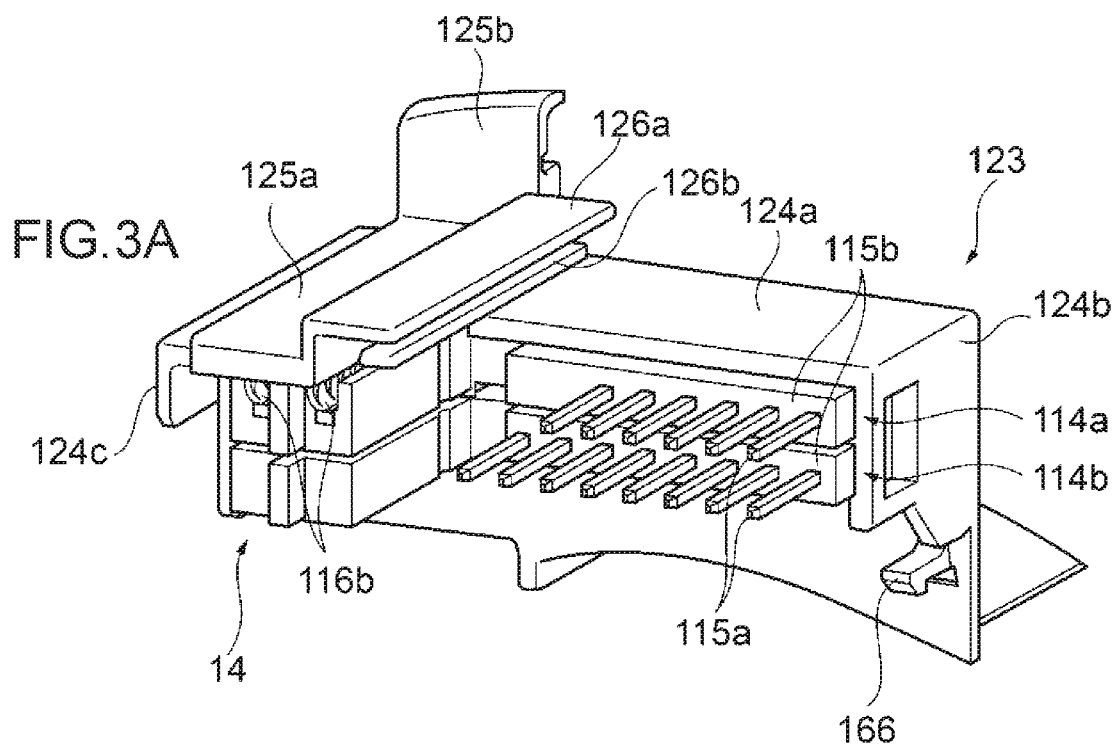
FIG. 3A is a perspective view of the connector holding section when viewed from top.
Figure 3B:
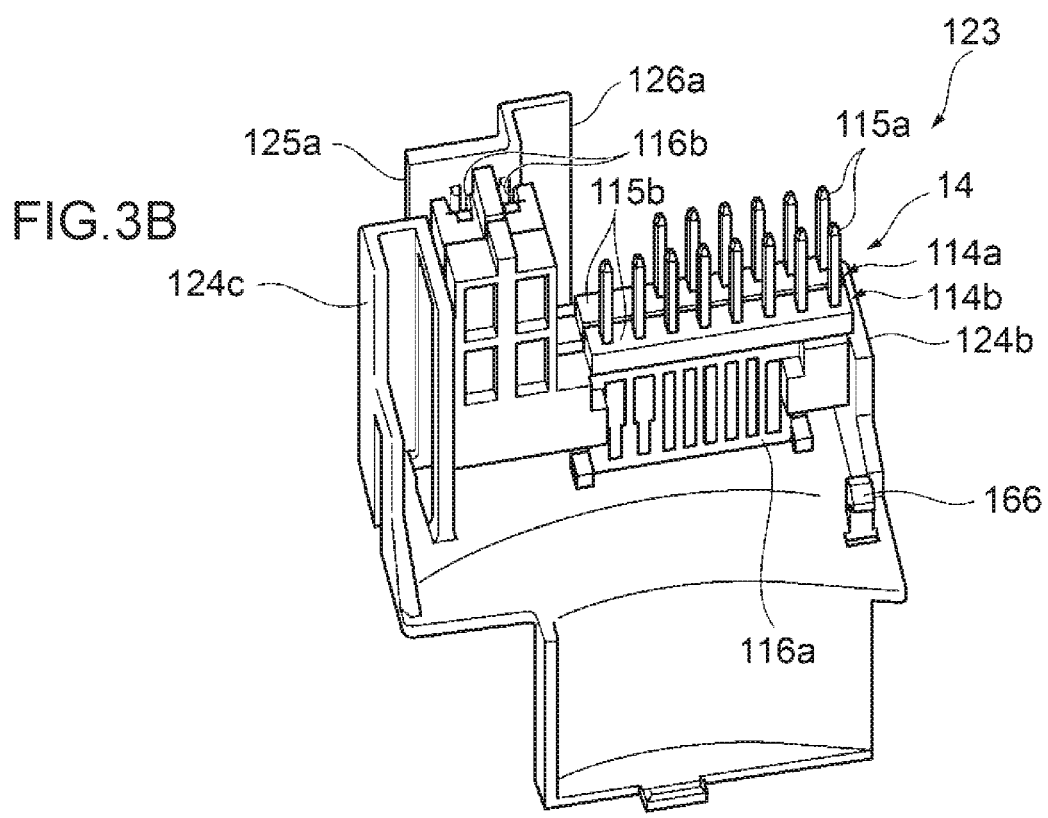
FIG. 3B is a perspective view of the connector holding section when viewed from an inner peripheral side.

As illustrated in FIGS. 3A and B, the connector holding section 123 includes an outer peripheral wall portion 124a defining the peripheral surface on the outer peripheral side, and side peripheral wall portions 124b and 124c defining peripheral surfaces substantially vertical to the outer peripheral wall portion 124a from an end portion in a circumferential direction of the outer peripheral wall portion 124a toward the inner peripheral side. The outer peripheral wall portion 124a and the side peripheral wall portions 124b and 124c hold the rotator side connector 14. The outer peripheral wall portion 124a and the side peripheral wall portions 124b and 124c are formed to cover and hold, when the connector holding section 123 is locked in the rotator side connector housing space S2, the rotator side connector 14 from around the upper end portion (the end portion in the direction of the arrow C in FIG. 1) to the lower end portion (adjacent to the top plate 21a of the rotator main body 21). The rotator side connector 14 held by the connector holding section 123 will be described later in detail.

The connector holding section 123 includes an outer wall portion 125a and a peripheral wall portion 125b configured to be positioned in the recessed portion 24b of the rotator side connector housing section 22 (FIG. 3A). The outer wall portion 125a is configured to be positioned in the recessed portion 24b of the rotator side connector housing section 22, which is formed along the peripheral surface on the outer peripheral side. The peripheral wall portion 125b is configured to be positioned in the recessed portion 24b of the rotator side connector housing section 22, which is formed on an outer peripheral end portion of the top plate 21a of the rotator main body 21. When the connector holding section 123 is locked in the rotator side connector housing space S2, the outer wall portion 125a serves as a member defining a part of the peripheral surface on the outer peripheral side of the connector holding section 123, whereas the peripheral wall portion 125b serves as a member defining a part of the outer peripheral end portion of the connector holding section 123. That is, the outer wall portion 125a and the peripheral wall portion 125b are formed to cover the recessed portion 24b when the connector holding section 123 is locked inside the rotator side connector housing space S2. Therefore, it is preferable that a width in the circumferential direction of the outer wall portion 125a be equal to a width in the circumferential direction of the recessed portion 24b or smaller than the width in the circumferential direction of the recessed portion 24b. It is preferable that a width in the circumferential direction of the peripheral wall portion 125b be equal to the width in the circumferential direction of the recessed portion 24b or smaller than the width in the circumferential direction of the recessed portion 24b.

Further, the connector holding section 123 includes the protruded wall portion 126a protruding from the peripheral surface on the outer peripheral side, and an inner peripheral plate portion 126b provided between the protruded wall portion 126a and the outer peripheral wall portion 124a and configured to be positioned on the inner peripheral side of the groove wall portion 24e (FIG. 3A). The protruded wall portion 126a is formed to be inserted into the groove portion 24c (FIG. 2), and is inserted into the groove portion 24c when the connector holding section 123 is inserted into and locked inside the rotator side connector housing space S2. The protruded wall portion 126a is formed continuously without having a gap from the upper end portion (the end portion in the direction of the arrow C in FIG. 1) to the lower end portion (adjacent to the top plate 21a of the rotator main body 21) of the rotator side connector housing section 22. It is preferable that a thickness of the protruded wall portion 126a be equal to a spacing between the groove wall portions 24d and 24e or smaller than the spacing between the groove wall portions 24d and 24e. The inner peripheral plate portion 126b is formed, when the connector holding section 123 is inserted into the rotator side connector housing space S2, to at least partially come into contact with a part on the inner peripheral side of the groove wall portion 24e to guide the protruded wall portion 126a into a space between the groove wall portions 24d and 24e. It is preferable that, in order to guide the protruded wall portion 126a into the space between the groove wall portions 24d and 24e upward (in the direction of the arrow C in FIG. 1), the inner peripheral plate portion 126b be formed from the upper end portion (the end portion in the direction of the arrow C in FIG. 1) to the lower end portion (adjacent to the top plate 21a of the rotator main body 21) of the rotator side connector housing section 22.

As described above, since the groove portion 24c (see FIG. 2), the protruded wall portion 126a, and the inner peripheral plate portion 126b are formed from the upper end side of the rotator side connector housing section 22 to the top plate 21a of the rotator main body 21, when the connector holding section 123 is inserted into and locked inside the rotator side connector housing space S2, the labyrinth structure is formed from the upper end side of the rotator side connector housing section 22 to the top plate 21a of the rotator main body 21 (see FIG. 1). The labyrinth structure denotes a complex structure formed in the locking portion 143 when, for example, either of the rotator main body 21 and the connector holding section 123 is provided with at least one recessed portion, whereas the other is provided with at least one projected portion, and the recessed portion and the projected portion disposed to correspond to the recessed portion engage or fit with each other (described later, see FIGS. 5B and 5C).

The connector holding section 123 includes the lock claw 166 that protrudes from a peripheral surface on the inner peripheral side and constitutes the lock portion 25. When the lock claw 166 is inserted into the lock hole 165 formed on the rotator side connector housing section 22 and is locked to the lock hole 165, the connector holding section 123 locked in the rotator side connector housing space S2 is supported.

Figure 4:
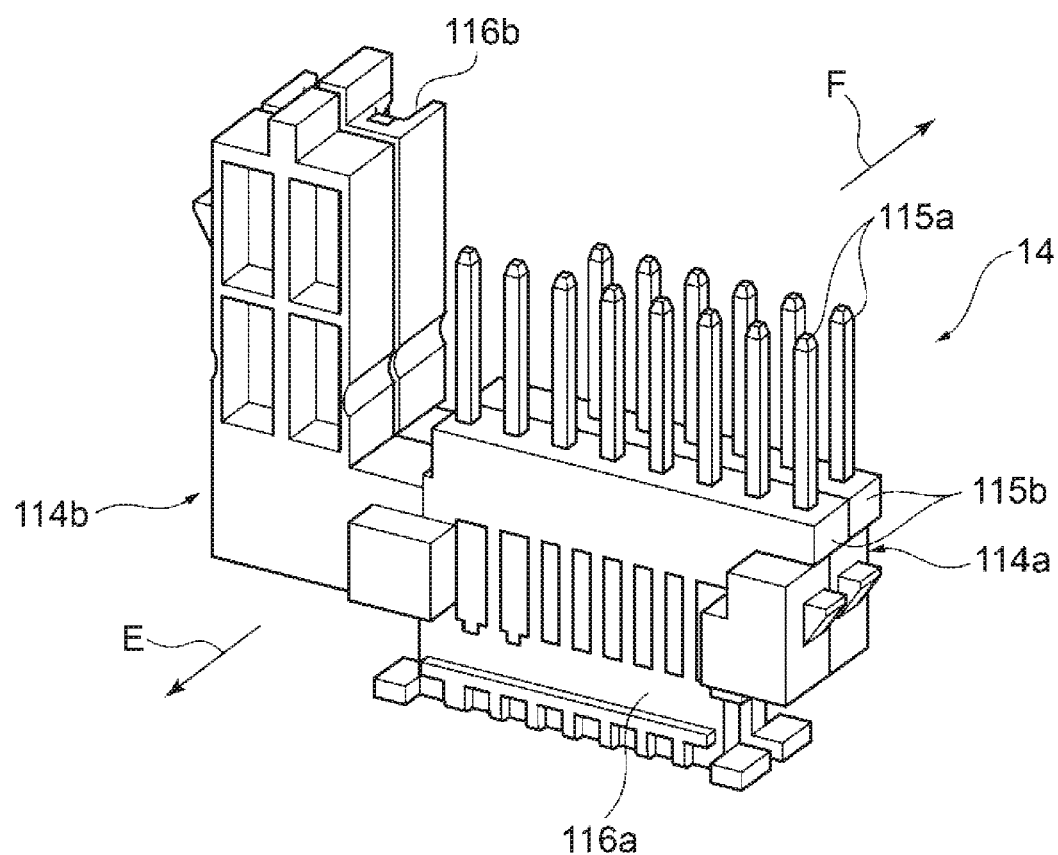
FIG. 4 is a perspective view of a rotator side connector held by the connector holding section illustrated in FIG. 3.

Next, a configuration of the rotator side connector 14 held by the connector holding section 123 will be described in detail with reference to FIG. 4. FIG. 4 is a perspective view of the rotator side connector 14 held by the connector holding section 123 illustrated in FIG. 3. As illustrated in FIG. 4, the rotator side connector 14 includes an outer peripheral side connector 114a having an approximately L-shape when viewed in a direction of an arrow F from an arrow E (when viewed from the inner peripheral side), and held by the connector holding section 123 on the outer peripheral side (adjacent to the arrow F), and an inner peripheral side connector 114b having an approximately L-shape when viewed in the direction of the arrow F from the arrow E (when viewed from the inner peripheral side), and held by the connector holding section 123 on the inner peripheral side (adjacent to the arrow E). The outer peripheral side connector 114a and the inner peripheral side connector 114b respectively include, on a right side when viewed in the direction of the arrow F from the arrow E (when viewed from the inner peripheral side), pluralities of busbars 115a made of metal, busbar cases 115b made of synthetic resin and configured to hold the busbars 115a, and the connecting portions 116a serving as portions exposed from the busbar cases 115b and connected with a conductor portion of the flexible cable 16. The busbars 115a are portions to be connected with terminals connected with cables extending from switches, for example, on a steering wheel. Pluralities of terminals protrude from the busbar cases 115b in a predetermined direction (the direction of the arrow C in FIG. 1). The busbar cases 115b respectively internally house intermediate portions (not illustrated) connecting the busbars 115a and the connecting portions 116a to each other. The connecting portions 116a connected with the conductor portion of the flexible cable 16 are surrounded and held by the outer peripheral wall portion 124a and the side peripheral wall portion 124b.

The outer peripheral side connector 114a includes, on a left side when viewed in the direction of the arrow F from the arrow E (when viewed from the inner peripheral side), cable housing sections 116b configured to house the lead cables with connectors for air bag connection, which are to be connected with electric circuits of devices including an air bag device, for example, attached to the steering wheel. The cable housing sections 116b protrude from the connecting portion 116a in the predetermined direction (the direction of the arrow C in FIG. 1), and are connected, through welding, for example, with the lead cables with connectors for air bag connection, which are to be connected with the electric circuits of devices including the air bag device, for example (not illustrated).

Next, a method for housing the rotator side connector 14 will be described with reference to FIGS. 5A to 5C. To house the rotator side connector 14, the connector holding section 123 holding the rotator side connector 14 is locked in the rotator side connector housing space S2. FIG. 5 is a view illustrating the rotator side connector housing section 22 in the rotary connector device 1 illustrated in FIG. 1, where FIG. 5A is a plan view illustrating a state of the rotator side connector housing section 22 in the rotary connector device 1 illustrated in FIG. 1 when viewed from the outer peripheral side, FIG. 5B is a cross-sectional view taken along line A-A illustrated in FIG. 5A, and FIG. 5C is a cross-sectional view taken along line B-B illustrated in FIG. 5A.

In the method for housing the rotator side connector 14, the connector holding section 123 is first allowed to hold the rotator side connector 14. Specifically, the outer peripheral wall portion 124a (FIG. 5C) and the side peripheral wall portions 124b and 124c are allowed to cover and hold the rotator side connector 14. Specifically, the outer peripheral wall portion 124a and the side peripheral wall portion 124b adjacent to the busbars 115a (see FIG. 3) surround and cover the connecting portions 116a from around upper end portions (end portions in the direction of the arrow C in FIG. 1) to lower end portions (adjacent to the top plate 21a of the rotator main body 21) of the busbar cases 115b (see FIG. 3). The outer peripheral wall portion 124a and the side peripheral wall portion 124c adjacent to the cable housing sections 116b (see FIG. 3) are allowed to surround the cable housing sections 116b from around upper end portions (end portions in the direction of the arrow C in FIG. 1) to lower end portions (adjacent to the top plate 21a of the rotator main body 21) of the cable housing sections 116b to hold the rotator side connector 14.

To lock the connector holding section 123 in the rotator side connector housing space S2, the connector holding section 123 is inserted into the rotator side connector housing section 22 upward in the direction of the axis line X of the rotary connector device 1. Specifically, the protruded wall portion 126a of the connector holding section 123 is inserted into the groove portion 24c in FIG. 2, and the connector holding section 123 is moved upward in the direction of the axis line X and inserted into the rotator side connector housing section 22.

Note that, as described above, the lead cables with connectors for air bag connection, which are to be connected with the electric circuits of devices including the airbag device, for example, attached to the steering wheel, are connected in advance, through welding, for example, to the cable housing sections 116b of the rotator side connector 14. Since the lead cables extend downward when the rotator side connector 14 is housed in the connector holding section 123, the connector holding section 123 is inserted into the rotator side connector housing section 22 so that the lead cables pass through the recessed portion 24b of the rotator side connector housing section 22 and are folded to extend upward. When the connector holding section 123 is inserted into the rotator side connector housing section 22, the outer wall portion 125a and the peripheral wall portion 125b cover the recessed portion 24b, and the lead cables extend upward above the connector holding section 123.

When the connector holding section 123 is further moved, the lock claw 166 of the connector holding section 123 comes into contact with the inclined portion 24f lying adjacent to the lock hole 165, and then warps and deforms toward the outer peripheral side. When the connector holding section 123 is moved relative to the rotator side connector housing space S2 to a desired locking position (a position illustrated in FIG. 1), the lock claw 166 enters into the lock hole 165. At this time, the lock claw 166 is neither warped nor deformed. The lock claw 166 is thus locked in the lock hole 165 in a snap-fit manner. Therefore, the connector holding section 123 is locked in the rotator side connector housing space S2, and the connector holding section 123 locked in the rotator side connector housing space S2 is supported by the lock portion 25.

While the connector holding section 123 is locked in the rotator side connector housing space S2, the locking portion 143 of the rotator side connector housing section 22 has the labyrinth structure in the cylindrical portion 24a (see FIG. 1) of the rotator side connector housing space S2 housing the connecting portions 116a serving as portions connected with the flexible cable 16 in a direction from outside to inside of the rotator side connector housing space S2 (FIGS. 5B and C). Specifically, the locking portion 143 includes the groove portion 24c (see FIG. 2) formed along the peripheral surface on the outer peripheral side of the rotator side connector housing section 22, and the protruded wall portion 126a protruding from the peripheral surface on the outer peripheral side of the connector holding section 123 and configured to be inserted into the groove portion 24c. When the protruded wall portion 126a is inserted into the groove portion 24c, and the inner peripheral plate portion 126b is positioned on the inner peripheral side of the protruded wall portion 126a, the labyrinth structure is formed in the direction from outside to inside of the rotator side connector housing space S2. As described above, since the groove portion 24c, the protruded wall portion 126a, and the inner peripheral plate portion 126b are formed from the upper end side of the rotator side connector housing section 22 to the top plate 21a of the rotator main body 21, the labyrinth structure described above is formed from the upper end side of the rotator side connector housing section 22 to the top plate 21a of the rotator main body 21.

When the connector holding section 123 is locked in the rotator side connector housing space S2, the outer wall portion 125a and the peripheral wall portion 125b seal a space defined by the recessed portion 24b (FIGS. 5B and C).

When the connector holding section 123 is locked in the rotator side connector housing space S2, the locking portion 143 of the rotator side connector housing section 22 has the labyrinth structure in the direction from outside to inside of the rotator side connector housing space S2. Therefore, even when liquid enters from a gap between the recessed portion 24b and the outer wall portion 125a or the peripheral wall portion 125b, entry of the liquid into the rotator side connector housing section 22 can be suppressed, reducing a possibility of allowing the liquid to reach the rotator side connector 14. In known rotary connector devices, gaps, holes, grooves, and the like that each communicate with an interior of a rotator side connector housing space are formed in a rotator side connector housing section. Therefore, in the known rotary connector devices, liquid sometimes enters into the rotator side connector housing space, and the liquid entered sometimes reaches a connecting portion connected with a flexible cable of a rotator side connector. However, in the rotary connector device 1 according to the first embodiment of the disclosure, as described above, the locking portion 143 locked with the connector holding section 123 has the labyrinth structure, extending a liquid entry route from outside in a radial direction of the rotary connector device 1 to the rotator side connector housing space S2, compared with a case when the locking portion 143 has a linear shape. Therefore, entry of liquid into the rotator side connector housing section 22 can be suppressed, reducing a possibility of allowing liquid to reach the rotator side connector 14. In particular, the locking portion 143 has the labyrinth structure in the direction from outside to inside of the rotator side connector housing space S2 on a side where the connecting portions 116a connected with the flexible cable 16 are housed in the rotator side connector 14, reducing a possibility of allowing liquid to reach the connecting portions 116a.

As described above, with the rotary connector device 1 according to the first embodiment of the disclosure, the labyrinth structure of the locking portion 143 extends the liquid entry route to the rotator side connector 14 and the connecting portion 116a, preventing green rust from forming on the rotator side connector 14 and the connecting portion 116a, for example.

By forming the labyrinth structure from the upper end side of the rotator side connector housing section 22 to the top plate 21a of the rotator main body 21, a possibility of allowing liquid to enter into the rotator side connector housing section 22 can further be reduced.

Further, the locking portion 143 includes the groove portion 24c formed on the rotator side connector housing section 22, and the protruded wall portion 126a of the connector holding section 123, which can be inserted into the groove portion 24c. Therefore, by inserting the protruded wall portion 126a into the groove portion 24c, the connector holding section 123 can be easily locked in the rotator side connector housing space S2. The groove portion 24c is formed along the peripheral surface on the outer peripheral side of the rotator side connector housing section 22. That is, by forming the groove portion 24c along the peripheral surface, the locking portion 143 used to lock the connector holding section 123 inside of the rotator side connector housing space S2 can be provided without making gaps, holes, and grooves, for example, in a liquid entry direction (adjacent to the outer peripheral surface).

Since, in the connector holding section 123, the outer peripheral wall portion 124a and the side peripheral wall portions 124b and 124c surround and hold the rotator side connector 14, a possibility of allowing entered liquid to reach the rotator side connector 14 can be reduced. Specifically, since the outer peripheral wall portion 124a on the outer peripheral side and the side peripheral wall portions 124b and 124c substantially vertical to the outer peripheral wall portion 124a surround the rotator side connector 14, even when liquid enters into a gap between the recessed portion 24b and the outer wall portion 125a or the peripheral wall portion 125b, a liquid entry route heads in a direction of an arrow G and a direction of an arrow H in FIGS. 5B and 5C, reducing a possibility of allowing liquid to reach the rotator side connector 14.

By providing, on the inner peripheral side, the lock portion 25 configured to support the connector holding section 123 locked in the rotator side connector housing space S2, gaps, holes, and grooves, for example, in the liquid entry direction (adjacent to the outer peripheral surface) can be reduced.

In the rotary connector device 1 described above, the locking portion 143 has the labyrinth structure defined by the groove portion 24c of the rotator side connector housing section 22 and the protruded wall portion 126a of the connector holding section 123. However, the shape of the locking portion 143 is not limited to have the structure defined by the groove portion 24c and the protruded wall portion 126a. For example, a groove portion may be formed on the connector holding section 123, as well as a protruded wall portion may be formed on the rotator side connector housing section 22. As for the labyrinth structure of the locking portion 143, a groove portion and/or a protruded wall portion formed on the rotator main body 21 and the connector holding section 123 may form a complex structure at at least one location between the rotator side connector housing section 22 and the connector holding section 123. The complex structure described above may have another shape, such as crank shape or a meandering shape, in the direction from outside to inside of the rotator side connector housing space S2.

In the rotary connector device 1 described above, the lock portion 25 includes the lock hole 165 formed on the rotator side connector housing section 22, and the lock claw 166 formed on the connector holding section 123. However, the shape of the lock portion 25 is not limited to a shape defined by the lock hole 165 and the lock claw 166. For example, a lock portion may include a lock hole formed on the connector holding section 123, and a lock claw formed on the rotator side connector housing section 22.

Figure 6:
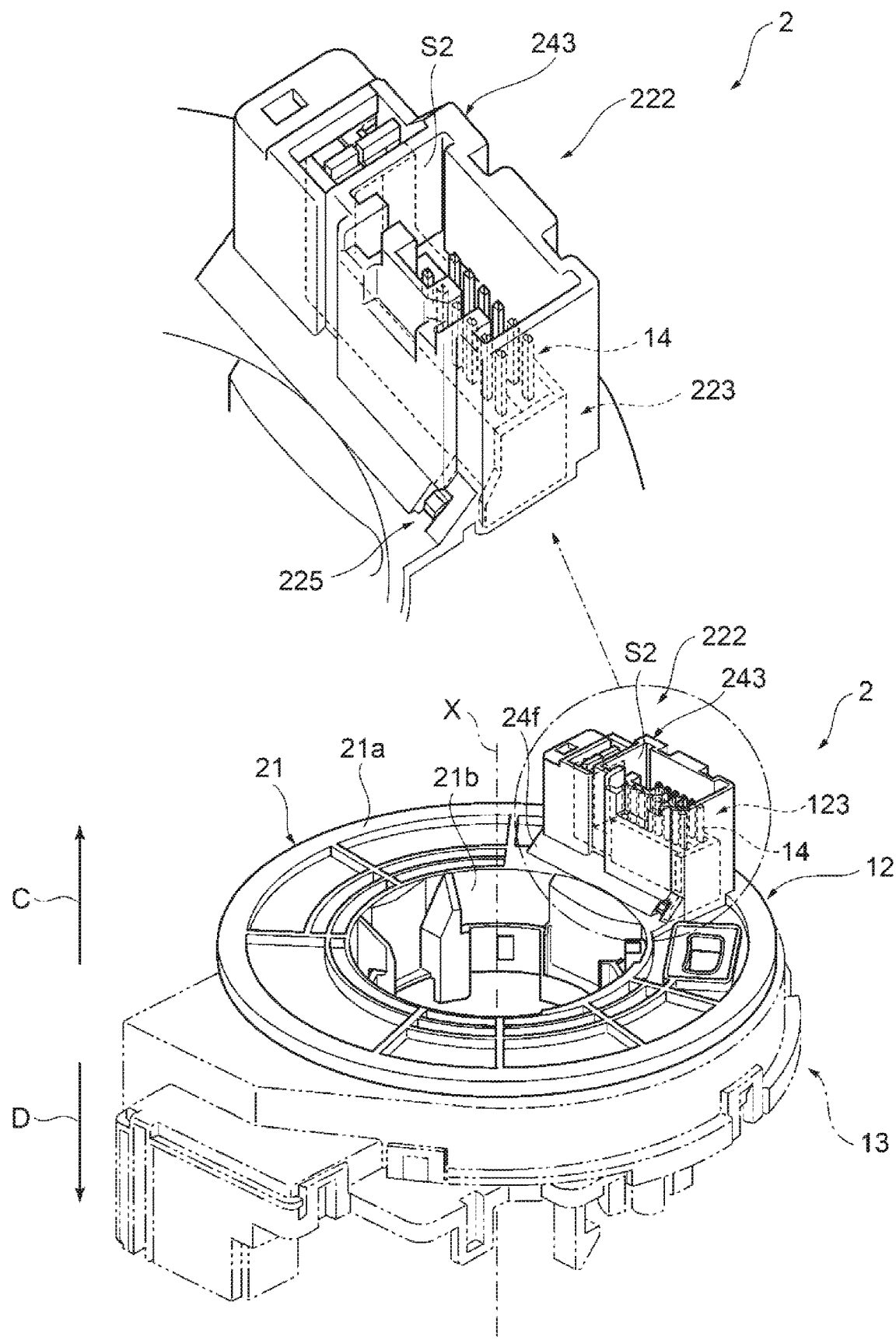
FIG. 6 is a perspective view illustrating a schematic configuration of a rotary connector device according to a second embodiment of the disclosure.
Figure 7:
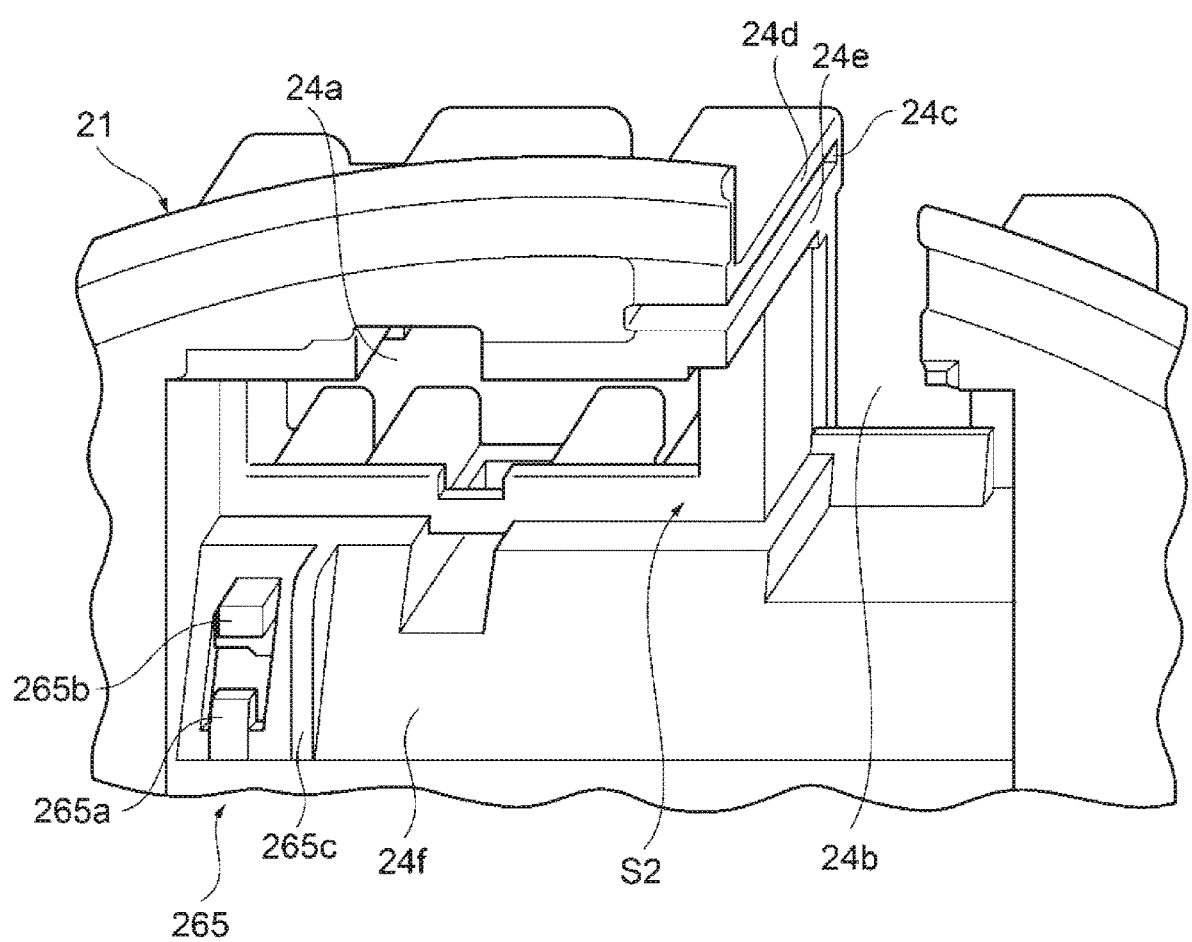
FIG. 7 is a perspective view of a rotator side connector housing section in the rotary connector device illustrated in FIG. 6.
Figure 8A:
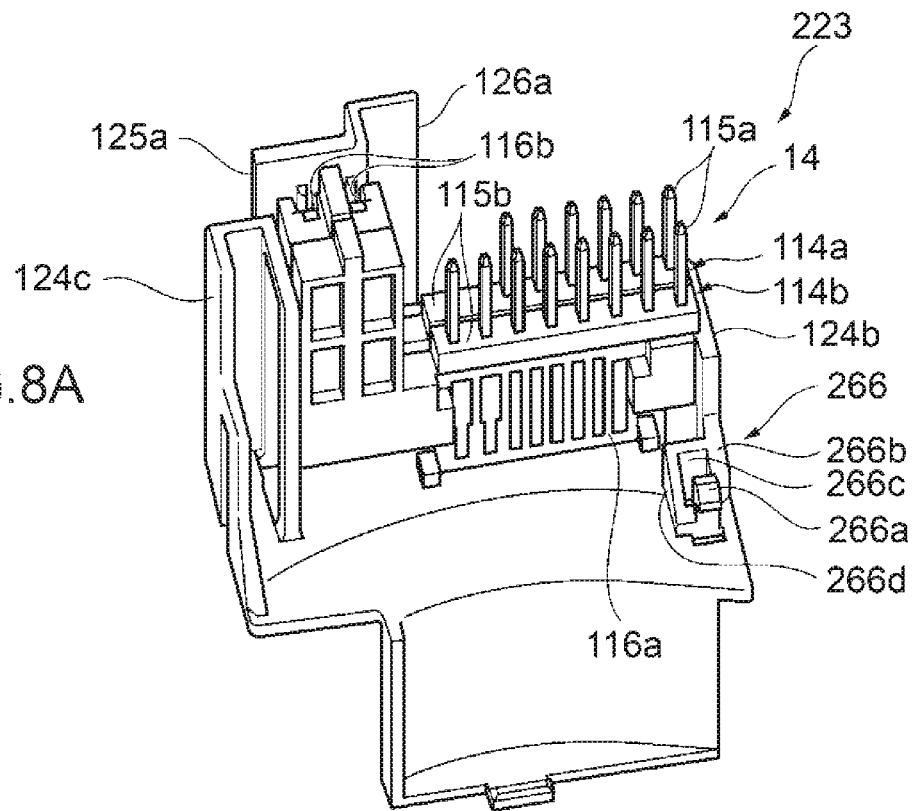
FIG. 8A is a perspective view illustrating the connector holding section in the rotary connector device according to the second embodiment of the disclosure.
Figure 8B:
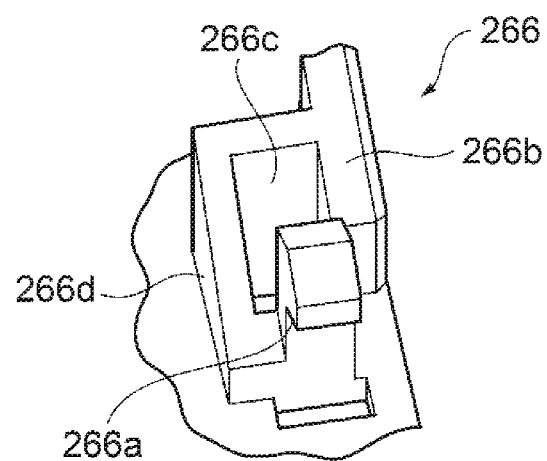
FIG. 8B is a partial enlarged perspective view illustrating a locking claw portion of the connector holding section according to the second embodiment of the disclosure.

Next, a rotary connector device 2 according to a second embodiment of the disclosure will be described with reference to FIGS. 6 to 8. FIG. 6 is a perspective view illustrating a schematic configuration of the rotary connector device 2 according to the second embodiment of the disclosure. FIG. 7 is a perspective view illustrating a rotator side connector housing section 222 in the rotary connector device 2 illustrated in FIG. 6. FIG. 8 is a perspective view of a connector holding section 223 in the rotary connector device 2 illustrated in FIG. 6, where FIG. 8A is a perspective view of the connector holding section 223 when viewed from the inner peripheral side, and FIG. 8B is a partial enlarged perspective view illustrating a lock portion 225 in the connector holding section 223.

Note that the rotary connector device 2 according to the second embodiment of the disclosure includes an improved version of the lock portion 25 of the rotator side connector housing section 22 of the rotary connector device 1 according to the first embodiment of the disclosure, and a configuration of other components is similar. Accordingly, in the following description, configurations that are the same or similar as the rotary connector device 1 according to the first embodiment of the disclosure described above are denoted by the same reference numerals as the rotary connector device 1 described above and the description thereof is omitted, and only different configurations will be described.

As illustrated in FIG. 6, the rotator 12 includes the rotator main body 21 that is an annular member surrounding the axis line X (the direction of the arrow A and the direction of the arrow B in FIG. 1), and the rotator side connector housing section 222 forming the rotator side connector housing space S2 that is a space passing through between the annular space S1 and outside of the annular space S1, protrudes from the rotator main body 21 to outside of the annular space S1, and capable of internally housing the rotator side connector 14.

The rotator side connector housing section 222 includes the connector holding section 223 configured to house, when the rotator side connector 14 is held and inserted in a direction of protrusion from the rotator main body 21 (the direction of the axis line X), the rotator side connector 14 in the rotator side connector housing space S2, and a locking portion 243 configured to lock the connector holding section 223 in the rotator side connector housing space S2 on the peripheral surface on the outer peripheral side among the peripheral surfaces in the direction of protrusion from the rotator main body 21 (the direction of the axis line X). The locking portion 243 has a configuration similar to the configuration of the locking portion 143 in the rotary connector device 1 according to the first embodiment described above.

As illustrated in FIG. 6, the rotator 12 includes, on the inner peripheral side, the lock portion 225 configured to support the connector holding section 223 locked in the rotator side connector housing space S2 by the locking portion 243. As illustrated in FIGS. 7 and 8, when a lock claw 266 formed on the connector holding section 123 and protruding from the peripheral surface on the inner peripheral side is locked to a lock hole 265 formed on the rotator side connector housing section 222, the lock portion 225 supports the connector holding section 223 locked in the rotator side connector housing space S2. The connector holding section 223 includes a contact wall portion 266b configured to at least partially come into contact with the rotator side connector housing section 222 between the lock claw 266 and the connecting portions 116a. That is, the contact wall portion 266b has an inclined shape to allow an upper end portion to come into contact with the inclined portion 24f around the lock hole 265. The expression at least partially come into close contact with includes that a part of the upper end portion of the contact wall portion 266b comes into contact with the inclined portion 24f, the upper end portion of the contact wall portion 266b comes into contact with the inclined portion 24f at a plurality of locations, and the upper end portion of the contact wall portion 266b fully comes into contact with the inclined portion 24f.

Specifically, the lock hole 265 is formed on the inner peripheral side to pass through from outside to inside of the rotator side connector housing space S2. When the connector holding section 223 is locked in the rotator side connector housing space S2, the lock claw 166 is inserted into and is locked to the lock hole 265, and the connector holding section 223 locked inside of the connector housing space S2 is supported (FIG. 6). As will be described later, the lock hole 265 includes a claw contact portion 265a to which, when the connector holding section 223 is locked in the rotator side connector housing space S2, a claw locking portion 266a of the lock claw 266 can be locked, a hole insertion portion 265b that is formed into a substantially bar shape and can be inserted into a hole portion 266c of the lock claw 266, and a guide piece 265c configured to come into contact with a lock side wall portion 266d of the contact wall portion 266b to guide the lock claw 266 to the lock hole 265.

As will be described later, the lock claw 266 includes the claw locking portion 266a configured, when the connector holding section 223 is locked in the rotator side connector housing space S2, to come into contact with the claw contact portion 265a, the contact wall portion 266b configured to come into contact with the inclined portion 24f lying adjacent to the lock hole 265 of the rotator side connector housing section 222, the hole portion 266c configured to be inserted with the hole insertion portion 265b, and the lock side wall portion 266d configured to come into contact with the guide piece 265c (FIG. 8B).

Next, a method for housing the rotator side connector 14 will be described with reference to FIGS. 6 to 8. When the connector holding section 223 holding the rotator side connector 14 is locked in the rotator side connector housing space S2, the rotator side connector 14 is housed.

In the method for housing the rotator side connector 14, the connector holding section 223 is first allowed to hold the rotator side connector 14. To lock the connector holding section 223 in the rotator side connector housing space S2, the connector holding section 223 is moved upward in the direction of the axis line X of the rotary connector device 1 to insert into the rotator side connector housing section 222.

When the connector holding section 223 is further moved, the guide piece 265c comes into contact with the lock side wall portion 266d, and the lock claw 266 is guided to the lock hole 265. As a result, a tip of the lock claw 266 moves upward (adjacent to the stator 13), comes into contact with the claw contact portion 265a, and warps and deforms toward the outer peripheral side.

When the connector holding section 223 is moved relative to the rotator side connector housing space S2 to a desired locking position (the position illustrated in FIG. 5), the lock claw 266 passes through the claw contact portion 265a. At this time, the lock claw 266 is neither warped nor deformed. The claw locking portion 266a then moves upward (toward the top plate 21a) and comes into contact with the claw contact portion 265a. The lock claw 266 is thus locked.

As the connector holding section 223 is moved relative to the rotator side connector housing space S2 to the desired locking position, the hole insertion portion 265b enters into the hole portion 266c, and the contact wall portion 266b comes into contact with the inclined portion 24f lying adjacent to the lock hole 265.

When the connector holding section 123 is locked in the rotator side connector housing space S2, the connector holding section 223 locked in the rotator side connector housing space S2 is supported by the lock portion 225.

As described above, similar to the rotary connector device 1 according to the first embodiment of the disclosure, in the rotary connector device 2 according to the second embodiment of the disclosure as well, it is possible to suppress liquid from entering inside of the rotator side connector housing section 222 and to prevent green rust from forming on the rotator side connector 14, the flexible cable 16, and the like.

In the rotary connector device 2 according to the second embodiment of the disclosure, when the lock claw 266 formed on the connector holding section 223 enters into the lock hole 265 formed on the inclined portion 24f of the rotator side connector housing section 222, the lock portion 225 is locked in the rotator side connector housing space S2 to support the connector holding section 223. Specifically, when the hole insertion portion 265b enters into the hole portion 266c, and the contact wall portion 266b comes into close contact with the inclined portion 24f lying adjacent to the lock hole 265, liquid would be less likely to enter into a gap between the lock hole 265 and the lock claw 266. In particular, since the contact wall portion 266b comes into contact with the inclined portion 24f lying around the lock hole 265 between the lock claw 266 and one of the connecting portions 116a (FIG. 8A), the contact wall portion 266b being in contact with the inclined portion 24f can suppress liquid entered from the gap between the lock hole 265 and the lock claw 266 from entering into the connecting portions 116a.

Further, since, when the connector holding section 223 is to be locked in the rotator side connector housing space S2, the guide piece 265c comes into contact with the lock side wall portion 266d, and the lock claw 266 is guided to the lock hole 265, the lock claw 266 can be easily inserted into the lock hole 265.

Next, variations to the rotary connector devices 1 and 2 according to the embodiments of the disclosure described above will be described with reference to FIGS. 9A to 9C.

Note that, in the rotary connector devices 1 and 2 according to the variations, the rotator side connector 14 described above has been improved, and the configuration of other portions is similar. Accordingly, in the following description, configurations that are the same or similar to the rotary connector devices 1 and 2 according to the embodiments of the disclosure described above are denoted by the same reference numerals as the rotary connector devices 1 and 2 described above and the description thereof is omitted, and only different configurations will be described.

Figure 9A:
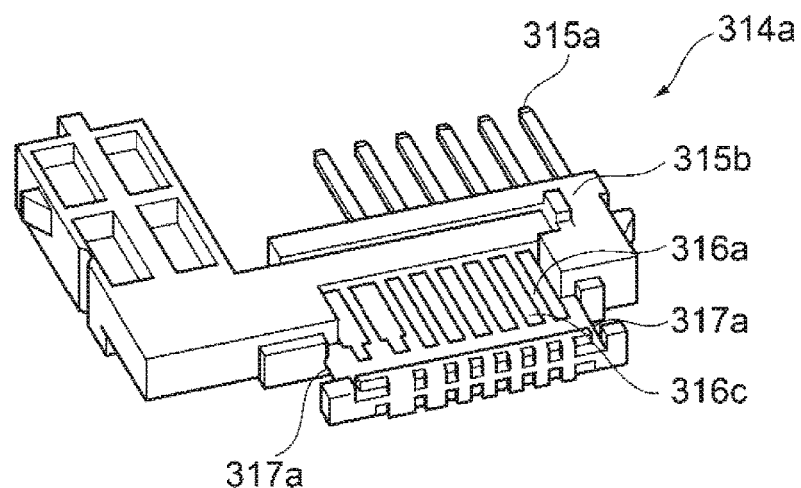
FIG. 9A is a perspective view illustrating the rotator side connector to be held on an inner peripheral side.
Figure 9B:
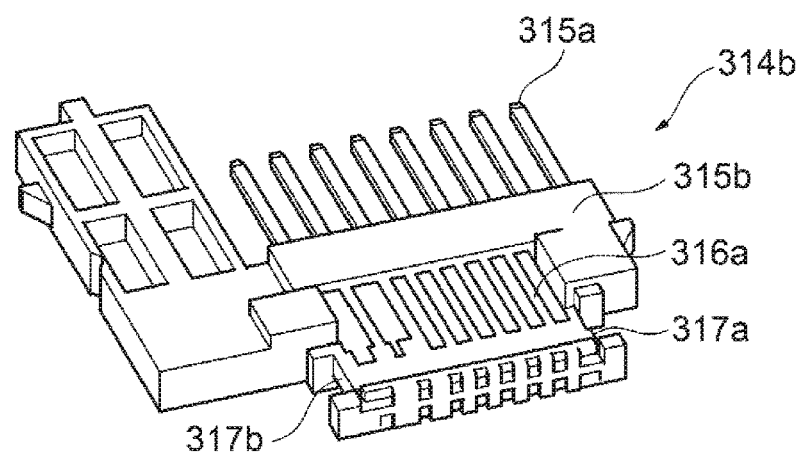
FIG. 9B is a perspective view illustrating the rotator side connector to be held on the outer peripheral side.
Figure 9C:
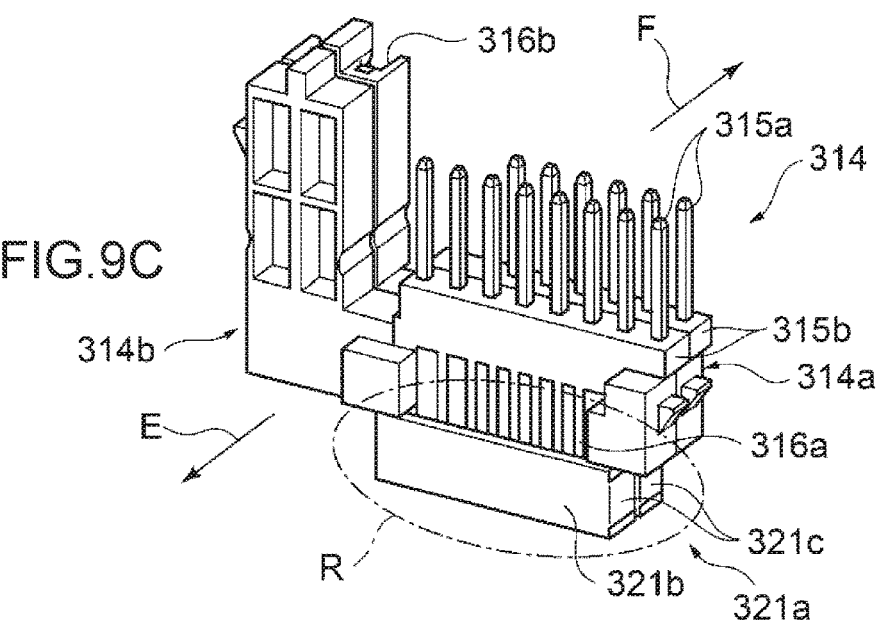
FIG. 9C is a perspective view illustrating a state when the rotator side connectors illustrated in FIGS. 9A and 9B are assembled.

The rotator side connector 314 includes an outer peripheral side connector 314a having an approximately L-shape when viewed in the direction of the arrow F from the arrow E in FIG. 9C (when viewed from the inner peripheral side), and to be held on the outer peripheral side (adjacent to the arrow F in FIG. 9C) illustrated in FIG. 9A, and an inner peripheral side connector 314b having an approximately L-shape when viewed in the direction of the arrow F from the arrow E in FIG. 9C (when viewed from the inner peripheral side), and to be held on the inner peripheral side (adjacent to the arrow E in FIG. 9C) illustrated in FIG. 9B.

The outer peripheral side connector 314a and the inner peripheral side connector 314b respectively include, on the right side when viewed in the direction of the arrow F from the arrow E (when viewed from the inner peripheral side), pluralities of busbars 315a made of metal, busbar cases 315b made of synthetic resin and configured to hold the busbars 315a, and connecting portions 316a serving as portions exposed from the busbar cases 315b and connected with the conductor portion of the flexible cable 16. The busbars 315a are portions to be connected with terminals connected with cables extending from switches, for example, on a steering wheel. Pluralities of terminals protrude from the busbar cases 315b in the predetermined direction (the direction of the arrow C in FIG. 1). The busbar cases 315b respectively internally house intermediate portions (not illustrated) connecting the busbars 315a and the connecting portions 316a to each other. The connecting portions 316a connected with the conductor portion of the flexible cable 16 are surrounded and held by the outer peripheral wall portion 124a and the side peripheral wall portion 124b (see FIGS. 3A and B).

The outer peripheral side connector 314a includes, on the left side when viewed in the direction of the arrow F from the arrow E (when viewed from the inner peripheral side), cable housing sections 316b housing the lead cables with connectors for air bag connection, which are to be connected with electric circuits of devices including an air bag device, for example, attached to the steering wheel. The cable housing sections 316b protrude from the connecting portions 316a in the predetermined direction (the direction of the arrow C in FIG. 1), and are connected, through welding, for example, with the lead cables with connectors for air bag connection, which are to be connected with the electric circuits of devices including the air bag device, for example (not illustrated).

As described above, the connecting portions 316a are exposed from the busbar cases 315b, and are electrically connected with the conductor portion of the flexible cable 16 (not illustrated). Portions of the connecting portions 316a, which are connected with the conductor portion of the flexible cable 16, are formed to be attached with cover members 321a.

Specifically, in the connecting portions 316a, end portions in a width direction of the outer peripheral side connector 314a and the inner peripheral side connector 314b are respectively formed with attachment recessed portions 317a and 317b used to attach the cover members 321a.

The cover members 321a respectively include outer peripheral surface portions 321b on the outer peripheral side, and protruding portions 321c representing surfaces substantially vertical to the outer peripheral surface portions 321b, and configured to be respectively inserted into the attachment recessed portions 317a and 317b.

Portions of connection conductors 316c, which are exposed to the inner peripheral side, on the connecting portions 316a between the outer peripheral side connector 314a and the inner peripheral side connector 314b illustrated in FIG. 9A, i.e., portions of regions R illustrated in FIG. 9C, are coated with an insulating resin material such as fluororesin.

Next, a method for assembling the rotator side connector 314 will be described with reference to FIGS. 9A to 9C.

In the method for assembling the rotator side connector 314, the conductor portion of the flexible cable 16 (not illustrated) is first welded to the connecting portions 316a to connect the connecting portions 316a and the conductor portion of the flexible cable 16 to each other.

When the protruding portions 321c of the cover members 321a are inserted into the attachment recessed portions 317a and 317b, the cover members 321a cover the connection conductors 316c exposed to the inner peripheral side on the connecting portions 316a connected to the flexible cable 16.

The portions covered with the cover members 321a, i.e., the regions R in FIG. 9C, are then coated with resin to coat the portions of the connection conductors 316c with an insulating resin material such as fluororesin.

As described above, similar to the rotary connector devices 1 and 2 according to the embodiments of the disclosure described above, in the rotary connector device according to another embodiment of the disclosure as well, it is possible to prevent green rust from forming on the rotator side connector 14 and the flexible cable 16, and the like.

In the rotary connector device according to the other embodiment of the disclosure, in the rotator side connector 314, the connection conductors 316c exposed to at least the inner peripheral side on the connecting portions 316a connected with the flexible cable 16 are coated with a resin material. Therefore, even when liquid enters into the rotator side connector housing space S2, and the entered liquid reaches the rotator side connector 14, the connection conductors 316c coated with a resin material can prevent green rust from forming.

As described above, in the rotator side connector 314, the connection conductors 316c exposed to the inner peripheral side on the connecting portions 316a connected to the flexible cable 16 are covered with the cover members 321a. However, the cover members 321a may be cover members for which the connection conductors 316c exposed to not only the inner peripheral side, but also the outer peripheral side are covered.

As described above, in the rotary connector devices 1 and 2 according to the embodiments of the disclosure, when the connector holding sections 123 and 223 are each locked in the rotator side connector housing space S2, the locking portions 143 and 243 of the rotator side connector housing sections 22 and 222 are each formed with the labyrinth structure in the direction from outside to inside of the rotator side connector housing space S2, and the liquid entry route to the rotator side connector 14 extends. Therefore, entry of liquid into the rotator side connector 14 and the connecting portions 116a can be suppressed.

In particular, since, in the connector holding section 123, the outer peripheral wall portion 124a and the side peripheral wall portions 124b and 124c surround and hold the rotator side connector 14, a possibility of allowing entered liquid to reach the rotator side connector 14 can be reduced.

The connector holding section 223 includes the contact wall portion 266b configured to at least partially come into close contact with the rotator side connector housing section 222 between the lock claw 266 and one of the connecting portions 116a. Therefore, liquid being entered would be less likely to reach the connecting portions 116a.

In the rotator side connector 314, the connection conductors 316c exposed to at least the inner peripheral side on the connecting portions 316a to be connected to the flexible cable 16 are coated with a resin material. Therefore, green rust can be prevented from forming on the rotator side connector 14 and the connecting portions 116a.

Although the rotary connector devices 1 and 2 according to the embodiments of the disclosure have been described above, the rotary connector device according to the disclosure is not limited to the rotary connector devices 1 and 2, and all aspects that fall within the concepts of the disclosure and the claims are included. In addition, the respective components may be selectively combined as appropriate in order to achieve at least part of the above-described problems and effects. For example, the shape, materials, arrangement, size, and the like of each constituent element in the above embodiments can be appropriately modified according to the specific usage mode of the invention. The configuration of each part can be replaced with a freely-selected configuration that has the same function.

The shapes of the rotator side connector housing sections 22 and 222, the connector holding sections 123 and 223, and the rotator side connectors 14 and 314 according to the embodiments of the disclosure described above are not limited to the illustrated shapes, but can be modified appropriately.

In the connector holding sections 123 and 223 according to the embodiments of the disclosure described above, the outer peripheral wall portion 124a and the side peripheral wall portion 124b lying adjacent to the busbars 315a cover the connecting portions 116a from around the upper end portions (the end portions in the direction of the arrow C in FIG. 1) to the lower end portions (adjacent to the top plate 21a of the rotator main body 21) of the busbar cases 315b. However, the rotator side connector 14 may be covered from the tips of the busbars 115a to the lower end portions (adjacent to the top plate 21a of the rotator main body 21).

Similarly, in the connector holding sections 123 and 223 according to the embodiments of the disclosure, the outer peripheral wall portion 124a and the side peripheral wall portion 124c lying adjacent to the cable housing sections 116b cover the cable housing sections 116b from around the upper end portions (the end portions in the direction of the arrow C in FIG. 1) to the lower end portions (adjacent to the top plate 21a of the rotator main body 21) of the cable housing sections 116b to hold the rotator side connector 14. However, the rotator side connector 14 may be covered from around the upper end portions (the end portions in the direction of the arrow C in FIG. 1) to the lower end portions (adjacent to the top plate 21a of the rotator main body 21) of the busbar cases 315b.

What is claimed is:

1. A rotary connector device comprising:
a rotator;
a stator that is a member configured to hold the rotator rotatably around an axis line and form an annular space around the axis line between the rotator and the stator;
a rotator side connector held by the rotator and configured to enable an external electrical connection;
a stator side connector held by the stator and configured to enable an external electrical connection; and
a flat cable that is flexible, housed in the annular space, and configured to electrically connect the rotator side connector and the stator side connector,
wherein
the rotator includes:
a rotator main body that is an annular member disposed around the axis line; and
a connector housing section having a connector housing space that is a space passing through between the annular space and outside of the annular space, protruding from the rotator main body to outside of the annular space, and capable of internally housing the rotator side connector,
the connector housing section includes;
a connector holding section capable of housing, when the rotator side connector is held and inserted in a direction of protrusion from the rotator main body, the rotator side connector in the connector housing space; and
a locking portion configured to lock the connector holding section in the connector housing space on a peripheral surface on an outer peripheral side among peripheral surfaces along the direction of protrusion from the rotator main body, and
the locking portion has a labyrinth structure in a direction, when the connector holding section is locked, from outside to inside of the connector housing space on a side housed with a connecting portion connected with the flat cable in the rotator side connector, wherein the labyrinth structure is formed from an upper end in a direction of protrusion of the connector housing section to a lower end adjacent to the rotator main body, and
wherein the locking portion includes a groove portion formed along the peripheral surface on the outer peripheral side of the connector housing section, and a protruded wall portion protruded from the peripheral surface on the outer peripheral side of the connector holding section and inserted into the groove portion,
wherein the connector holding section includes an outer peripheral wall portion defining the peripheral surface on the outer peripheral side, and side peripheral wall portions defining peripheral surfaces substantially vertical to the outer peripheral wall portion from an end portion in a circumferential direction of the outer peripheral wall portion toward an inner peripheral side, and the outer peripheral wall portion and the side peripheral wall portions hold the rotator side connector, and
wherein the connector housing section comprises a recessed portion, recessed toward the inner peripheral side from an enol portion on the outer peripheral side, and allows a cable connected with an external device to pass through the recessed portion, the rotator side connector comprises a cable housing section which holds the cable passing through the recessed portion, and the connector holding section comprises a wall portion covering the recessed portion.

2. The rotary connector device according to claim 1, wherein
the rotator further includes a lock portion configured to support, on an inner peripheral side, the connector holding section locked inside of the connector housing space by the locking portion, the lock portion supports the connector holding section locked in the connector housing space when a lock claw formed on the connector holding section and protruded from a peripheral surface on the inner peripheral side is locked to a lock hole formed on the connector housing section, and the connector holding section includes a contact wall portion configured to at least partially come into contact with the connector housing section between the lock claw and the connecting portion.

3. The rotary connector device according to claim 1, wherein, in the rotator side connector, a connection conductor at least exposed toward an inner peripheral side on the connecting portion connected with the flat cable is coated with a resin material.

4. The rotary connector device according to claim 2, wherein, in the rotator side connector, a connection conductor at least exposed toward the inner peripheral side on the connecting portion connected with the flat cable is coated with a resin material.

* * * * *